US011101882B1

(12) United States Patent
Ibach et al.

(10) Patent No.: US 11,101,882 B1
(45) Date of Patent: Aug. 24, 2021

(54) LOW ORDER REGENERATOR WITH HIGH ORDER TRAFFIC CONDITIONING IN OPTICAL TRANSPORT NETWORK

(71) Applicant: Ciena Corporation, Hanover, MD (US)

(72) Inventors: Trevor John Ibach, Manotick (CA); Larry Babineau, Ottawa (CA)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 16/903,801

(22) Filed: Jun. 17, 2020

(51) Int. Cl.
*H04B 10/27* (2013.01)
*H04B 10/03* (2013.01)
*H04J 14/02* (2006.01)

(52) U.S. Cl.
CPC ............. *H04B 10/03* (2013.01); *H04B 10/27* (2013.01); *H04J 14/021* (2013.01)

(58) Field of Classification Search
CPC .... H04B 10/03; H04B 10/0793; H04B 10/27; H04J 14/021
See application file for complete search history.

(56) References Cited

U.S. PATENT DOCUMENTS

| | | | |
|---|---|---|---|
| 9,088,380 B2 | 7/2015 | Ibach et al. | |
| 9,143,227 B2 | 9/2015 | Moynihan et al. | |
| 2002/0191648 A1* | 12/2002 | Yehuda | H04Q 11/0428 370/539 |
| 2006/0262728 A1* | 11/2006 | Addeo | H04L 43/00 370/248 |
| 2016/0036520 A1* | 2/2016 | Swinkels | H04L 45/22 398/1 |
| 2016/0056914 A1* | 2/2016 | Gareau | H04J 3/1664 398/52 |
| 2018/0102834 A1* | 4/2018 | Ibach | H04B 10/0793 |
| 2019/0260467 A1 | 8/2019 | Ibach et al. | |

OTHER PUBLICATIONS

International Telecommunication Union, ITU-T G.709.1/Y.1331.1, Telecommunication Standardization Sector of ITU, Flexible OTN short-reach interfaces, Jun. 2018, pp. 1-52.
International Telecommunication Union, ITU-T G.709.2/Y.1331.2, Telecommunication Standardization Sector of ITU, OTU4 long-reach interface, Jul. 2018, pp. 1-64.
International Telecommunication Union, ITU-T G.709/Y.1331, Telecommunication Standardization Sector of ITU, Interfaces for the optical transport network, Jun. 2016, pp. 1-244.
International Telecommunication Union, ITU-T G.798, Telecommunication Standardization Sector of ITU, Characteristics of optical transport network hierarchy equipment functional blocks, Dec. 2017, pp. 1-390.

* cited by examiner

*Primary Examiner* — Dzung D Tran
(74) *Attorney, Agent, or Firm* — Clements Bernard Walker; Lawrence A. Baratta, Jr.; Christopher L. Bernard

(57) ABSTRACT

A network element configured to operate in an Optical Transport Network (OTN) network includes one or more modules including a first regenerator port and a second regenerator port, wherein the one or more modules are configured to provide a Low Order (LO) regenerator function; and circuitry configured to detect the one or more modules are part of the LO regenerator function, and, responsive to detection of a fault on the first regenerator port, cause forward traffic conditioning at a High Order (HO) path to the second regenerator port. The forward traffic conditioning can include an Alarm Indication Signal (AIS) on the HO path.

20 Claims, 14 Drawing Sheets

LOW ORDER REGENERATOR WITH HIGH ORDER TRAFFIC CONDITIONING IN OPTICAL TRANSPORT NETWORK

FIELD OF THE DISCLOSURE

The present disclosure generally relates to optical networking. More particularly, the present disclosure relates to systems and methods for Low Order (LO) regenerator with High Order (HO) traffic conditioning in Optical Transport Network (OTN).

BACKGROUND OF THE DISCLOSURE

Optical networks include three general types of nodes, namely terminals (endpoints, Optical Add/Drop Multiplexers (OADMs), Reconfigurable OADMs (ROADMs), etc.), line amplifiers, and occasionally, 3R (Reamplification, Reshaping, and Retiming) regenerators ("regens"). Terminal nodes include channel add/drop as well as channel express. Intermediate line amplifiers are all-optical devices where amplification occurs across all channels (e.g., Erbium-Doped Fiber Amplifiers (EDFAs)). Finally, regenerators are where each optical channel is converted to an electrical signal and then back to an optical channel, namely Optical-Electrical-Optical (OEO) conversion. Regenerators are required where a channel can no longer remain in the optical domain, namely after a given number of line amplifiers between terminals, a given distance, etc. Optical networks can operate at Layer 0 (photonic) and Layer 1-TDM (Time Division Multiplexed), where Layer 0 focuses on the photonic aspects, line amplifiers, wavelengths, etc., and Layer 1 focuses on TDM-based channels, e.g., ~100 Gb/s signals, signals in increments of ~100 Gb/s, etc. The typical protocol used at Layer 1 is Optical Transport Network (OTN), such as described, e.g., in ITU-T G.709/Y.1331 (June 2016) "Interfaces for optical transport network," G. 709.1/Y. 1331.1 (June 2018) "Flexible OTN short-reach interface," G. 709.2/Y.1331.2 (July 2018) "OTU4 long-reach interface," ITU G.798 (December 2017) "Characteristics of optical transport network hierarchy equipment functional blocks," and the like, the contents of each are incorporated by reference in their entirety.

OTN includes Low Order (LO) and High Order (HO) mapping. LO is used when a client signal does not need further aggregation within the optical carrier (wavelength), and HO is used when sub-wavelength grooming and/or multiplexing is required. An OTN HO regenerator provides regeneration, but visibility is limited to the line rate, i.e., there is no visibility to client signals inside an OTN HO signal with the OTN HO regenerator. For example, for an Optical Channel Unit Cn (ODUCn) where C means 100 and n=1, 2, 3, . . . , an ODUC2 (~200 Gb/s) may include two Optical Data Unit level 4 (ODU4s) (i.e., 2×~100G clients) or 20 ODU2 (i.e., 20×~10 Gb/s clients) or other combinations. An HO ODUC2 regenerator does not provide visibility to the underlying clients. An LO OTN regenerator is configured to cross-connect the traffic between regenerator line ports at the service paths or rates that are being carried, instead of at the high order path layer. For example, an Optical Transport Unit Cn (OTUCn) regenerator carrying Optical Data Unit level k (ODUk), k=0, 1, 2, 2e, 3, 4, flex), traffic services will have the regenerator traffic cross-connected at the ODUk rates instead of the ODUCn rate. An OTUk regenerator carrying ODUj, j=0, 1, 2, and k>j, traffic services will have the regenerator traffic cross-connected at the ODUj rates instead of the ODUk rate. The problem with conventional LO OTN regenerators is they introduce latency (more signal processing), complexity (more signals to manage at the regenerator), and terminate the HO layer (which causes a management system to not be able to treat the LO regenerator as a regenerator for the HO signal). Of note, the HO regenerator is typically preferred, but an LO regenerator may be necessary because an HO regenerator is not available, it may be more cost effective for the LO regenerator, etc. However, it is desirable to solve the HO layer termination in the LO regenerator.

BRIEF SUMMARY OF THE DISCLOSURE

The present disclosure relates to systems and methods for Low Order (LO) regenerator with High Order (HO) traffic conditioning in Optical Transport Network (OTN). Specifically, the LO OTN regenerator described herein enables propagation of upstream faults at the HO layer. Again, in a conventional LO OTN regenerator, the HO path is terminated such that the HO path function does not forward information, such as traffic conditioning based on upstream line faults. The present disclosure includes a LO OTN regenerator that includes a new input to the terminated HO path function to force this forward traffic conditioning based on other existing statuses and the knowledge that this equipment performs a regenerator function. These existing statuses can be either of 1) failure of the HO path on the other regenerator line port, 2) equipment failures within the regenerator, 3) regenerator configuration incomplete, 4) interconnected client failures, and the like. These capabilities are above and beyond what OTN describes for normal networking behavior.

In an embodiment, a network element configured to operate in an Optical Transport Network (OTN) network includes one or more modules including a first regenerator port and a second regenerator port, wherein the one or more modules are configured to provide a Low Order (LO) regenerator function; and circuitry configured to detect that the one or more modules are part of the LO regenerator function, and, responsive to detection of a fault affecting the first regenerator port, cause forward traffic conditioning at a High Order (HO) path out of the second regenerator port. The forward traffic conditioning can include an Alarm Indication Signal (AIS) on the HO path. The forward traffic conditioning can be triggered through a Server Signal Fail (SSF) output from a HO path function associated with the first regenerator port. The forward traffic conditioning can be triggered by any of equipment failures and missing equipment associated with the LO regenerator function. The forward traffic conditioning can be triggered by any of incomplete configuration and incorrect configuration of the LO regenerator function. The forward traffic conditioning can be triggered by detection of failed Optical Transport Unit (OTU) client ports detected between the first regenerator port and the second regenerator port. The forward traffic conditioning can be triggered by detection of failed native client ports between the first regenerator port and the second regenerator port.

The one or more modules can be detected as being part of the LO regenerator function based on any of i) an automatic determination utilizing signal rates between the first regenerator port and the second regenerator port and based on cross connects between the first regenerator port and the second regenerator port, and ii) explicit configuration by a user. The one or more modules can include a single module including both the first regenerator port and the second regenerator port. The one or more modules can include two modules each including one of the first regenerator port and the second regenerator port, and wherein the two modules communicate to one another via an interface associated with the network element. The one or more modules can include two modules each including one of the first regenerator port and the second regenerator port, and wherein the two modules communicate to one another via ports that are cabled between one another.

In another embodiment, a method implemented in a network element configured to operate in an Optical Transport Network (OTN) network includes determining that equipment in the network element is part of a Low Order (LO) regenerator function; and, responsive to detection of a fault affecting a first regenerator port of the equipment, causing forward traffic conditioning at a High Order (HO) path across the equipment out of a second regenerator port. The forward traffic conditioning can include an Alarm Indication Signal (AIS) on the HO path. The forward traffic conditioning can be triggered by any of a Server Signal Fail (SSF) output from a HO path function associated with the first regenerator port, any of equipment failures and missing equipment associated with the LO regenerator function, any of incomplete configuration and incorrect configuration of the LO regenerator function, detection of failed Optical Transport Unit (OTU) client ports detected between the first regenerator port and the second regenerator port, and failed native client ports between the first regenerator port and the second regenerator port.

The one or more modules can be detected as being part of the LO regenerator function based on an automatic determination utilizing signal rates between the first regenerator port and the second regenerator port and based on cross connects between the first regenerator port and the second regenerator port. The one or more modules can include a single module including both the first regenerator port and the second regenerator port. The one or more modules can include two modules each including one of the first regenerator port and the second regenerator port, and wherein the two modules communicate to one another via an interface associated with the network element. The one or more modules can include two modules each including one of the first regenerator port and the second regenerator port, and wherein the two modules communicate to one another via ports that are cabled between one another.

In a further embodiment, a system includes one or more modules including a first regenerator port and a second regenerator port, wherein the one or more modules are configured to provide a Low Order (LO) Optical Transport Network (OTN) regenerator function; and circuitry configured to cause forward traffic conditioning at a High Order (HO) path out of the second regenerator port via passing a Regen Fail signal between the first regenerator port and the second regenerator port, responsive to detection of a fault affecting the first regenerator port. The forward traffic conditioning can include an Alarm Indication Signal (AIS) on the HO path.

BRIEF DESCRIPTION OF THE DRAWINGS

The present disclosure is illustrated and described herein with reference to the various drawings, in which like reference numbers are used to denote like system components/method steps, as appropriate, and in which.

DETAILED DESCRIPTION OF THE DISCLOSURE

Again, the present disclosure relates to systems and methods for Low Order (LO) regenerator with High Order (HO) traffic conditioning in Optical Transport Network (OTN). Specifically, the LO OTN regenerator described herein enables propagation of upstream faults at the HO layer. Again, in a conventional LO OTN regenerator, the HO path is terminated such that the HO path function does not forward information, such as traffic conditioning based on upstream line faults. The present disclosure includes a LO OTN regenerator that includes a new input to the terminated HO path function to force this forward traffic conditioning based on other existing statuses and the knowledge that this equipment performs a regenerator function. These existing statuses can be either of 1) failure of the HO path on the other regenerator line port, 2) equipment failures within the regenerator, 3) regenerator configuration incomplete, 4) interconnected client failures, and the like. These capabilities are above and beyond what OTN describes for normal networking behavior.

LO OTN Regenerators

As is known in the art, optical regenerators are network devices that perform Optical-Electrical-Optical (OEO) conversion. That is, regenerators are two-port optical devices, e.g., East and West port, with the receivers on each side receiving a signal and the transmitters on the other side transmitting a fully regenerated signal. The present disclosure relates to LO OTN regenerators meaning the signal is an OTN signal. Again, a LO OTN regenerator cross-connects traffic between regenerator line ports (or simply "regenerator ports") at the service paths or rates that are being carried, instead of at the HO path layer. Again, an example includes an OTUCn regenerator carrying ODUk traffic services that have the regenerator traffic cross-connected at the ODUk rates instead of the ODUCn rate. For example, an OTUk regenerator carrying ODUj traffic services has the regenerator traffic cross-connected at the ODUj rates instead of the ODUk rate. For example, an OTU4 (~100 Gb/s) carrying 10 ODU2 (~10 Gb/s) would have the regenerator traffic cross connected at ODU2 instead of ODU4 (~100 Gb/s).

The present disclosure maintains this functionality as well as adding HO signal information passage between the two regenerator ports, such that the LO OTN regenerator described herein provides both HO continuity, i.e., if the HO signal is failed, then it is propagated as a failed signal.

Figure 1A:
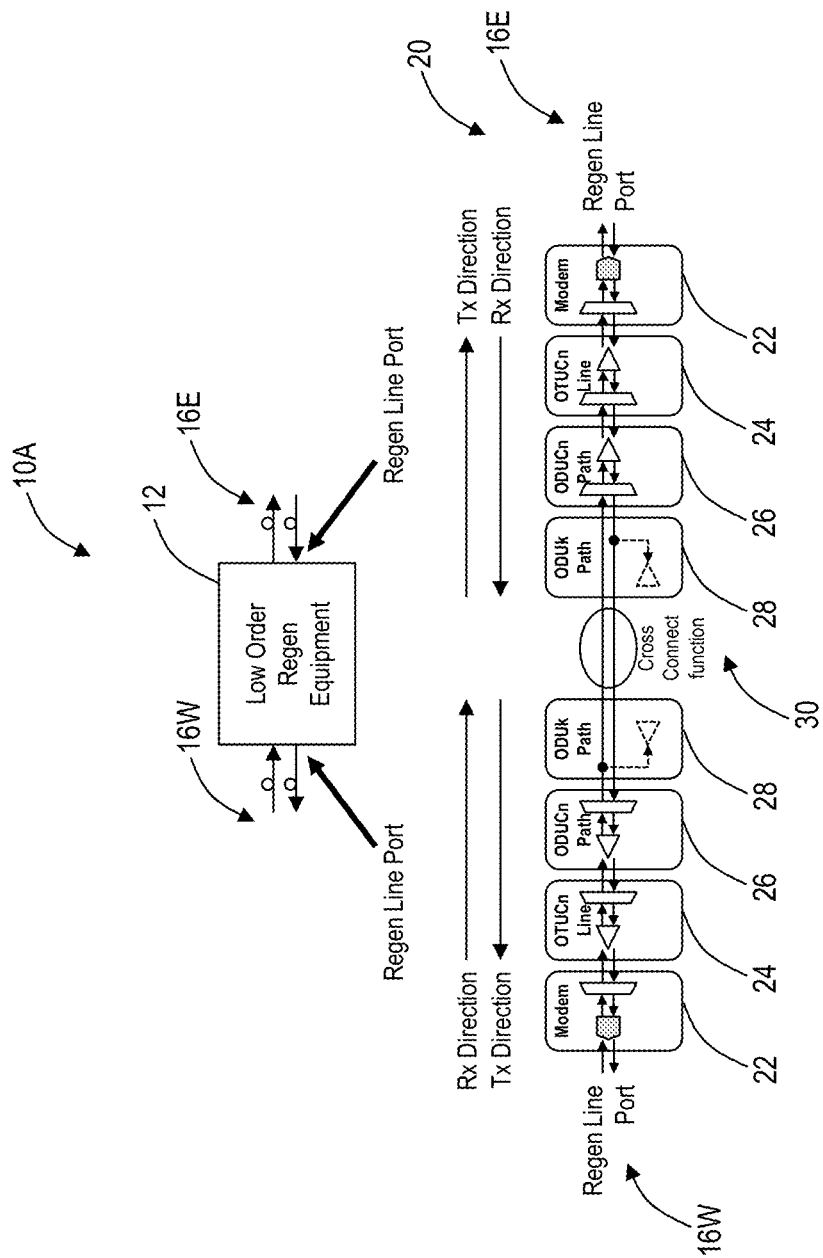
FIGS. 1A-1C are block diagrams of conventional LO OTN regenerators, specifically with FIG. 1A illustrating a LO OTN regenerator as a single device, FIG. 1B illustrating a LO OTN regenerator as two back-to-back optical modules, and FIG. 1C illustrating a LO OTN regenerator as two back-to-back optical modules using native clients.
Figure 1B:
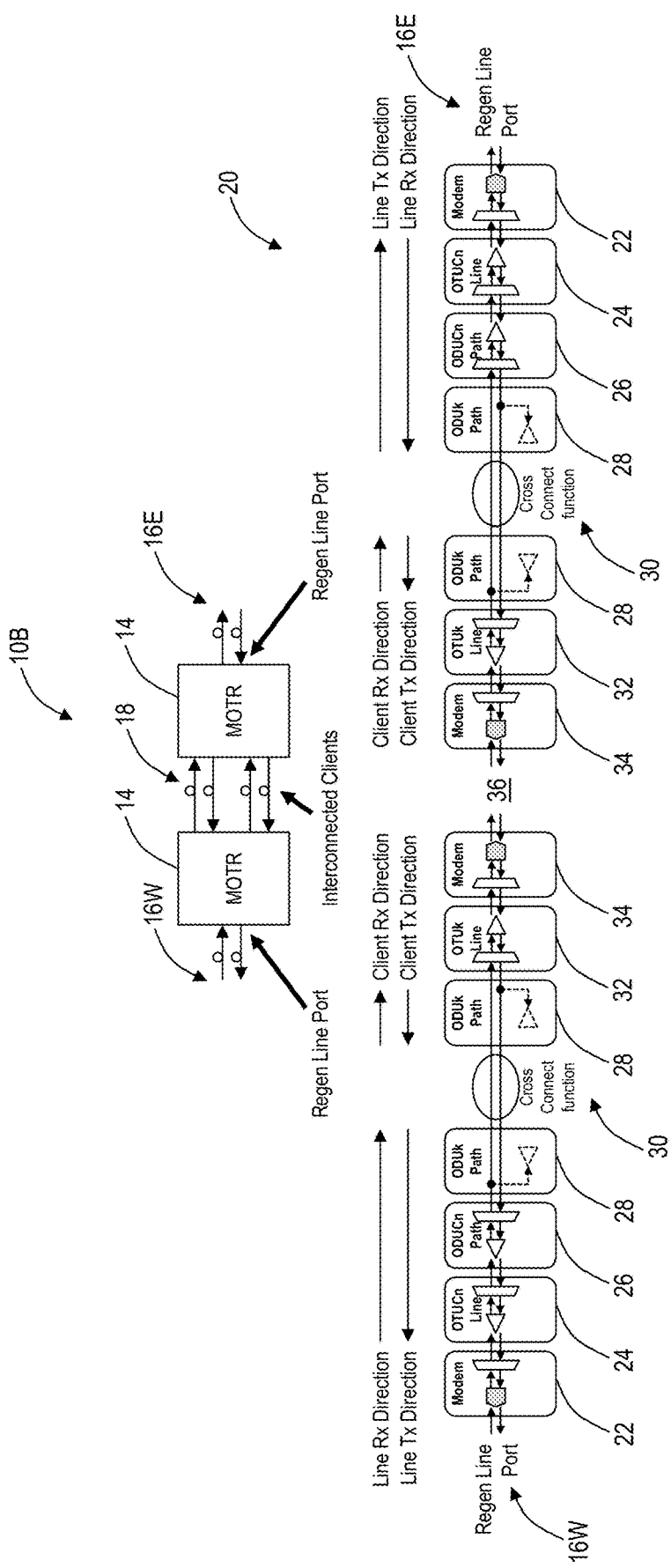
Figure 1C:
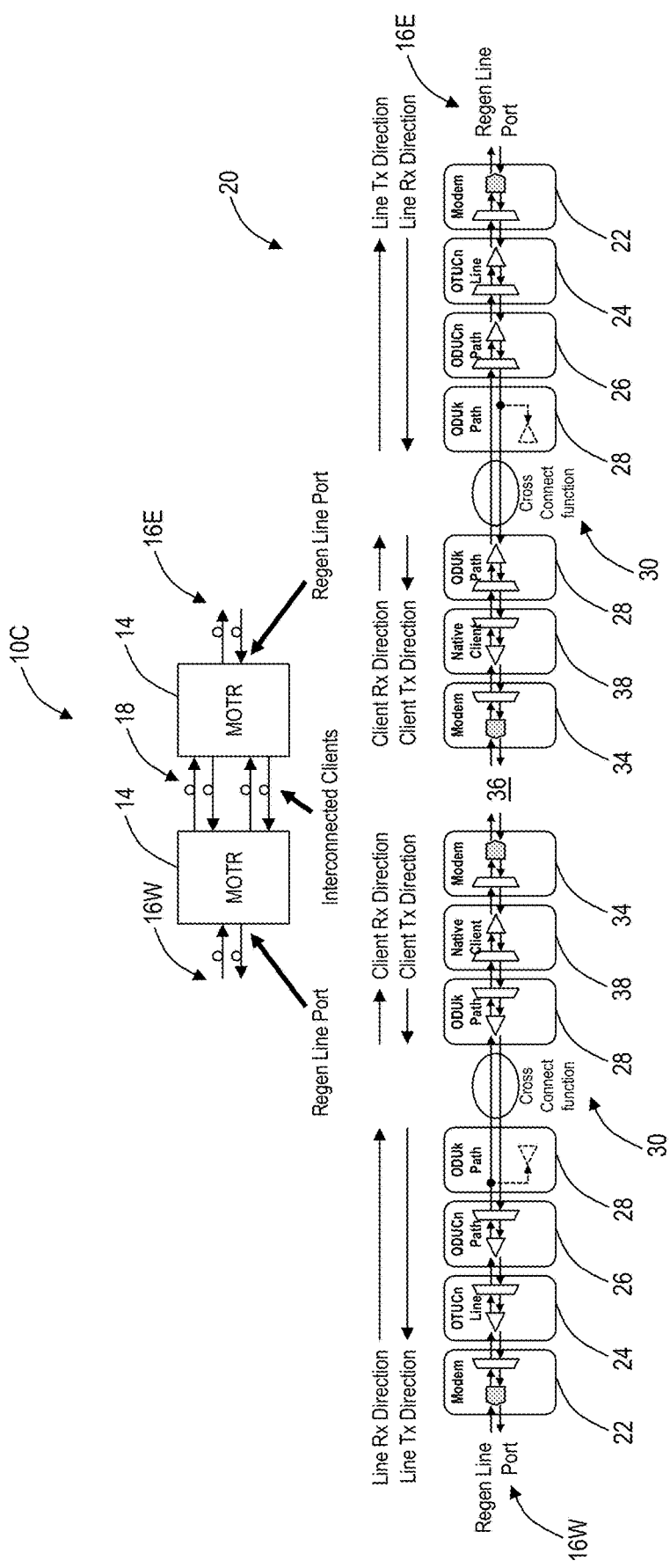

FIGS. 1A-1C are block diagrams of conventional LO OTN regenerators 10A, 10B, 10C, specifically with FIG. 1A illustrating a LO OTN regenerator as a single device 12, FIG. 1B illustrating a LO OTN regenerator as two back-to-back optical modules 14, and FIG. 1C illustrating a LO OTN regenerator as two back-to-back optical modules 14 using native clients. Those skilled in the art recognize a network element in a network can be realized with physical hardware that is typically a card or module that is inserted into a chassis or shelf, with communication between modules via a backplane or the like. An example implementation of a network element is described herein in FIG. 6. For this reason, the term module or equipment is used herein to describe a hardware device used to realize functionality, in the case of the present disclosure, an optical transceiver, transponder, regenerator, muxponder, etc. Other terms used for the module in the art include line card, circuit pack, blade, card, etc. A module includes electrical circuitry, optical components, interconnects, power, etc.

A module can have multiple ports, can support pluggable transceivers, etc. An optical transceiver module typically includes a transmit and receive port to provide bidirectional communication in one direction. Ports can typically be categorized as line ports (interfacing the network, the fibers to an adjacent site) or client ports (interfacing local equipment at the site, or even remote equipment). A transponder typically includes two pairs of transmit and receive ports to provide two-directional (East and West) communication. One of the ports of a transponder is typically a line port, and the other is a client port. The functionality of the transponder is to provide on-network access for subtending equipment, e.g., switches, routers, etc. Finally, a muxponder is a variant of the transponder with multiple client ports instead of one client port. For example, a muxponder may have a 100G, 200G, etc. line port and client ports at 10G, 40G, etc. Of course, other embodiments are also contemplated with the previous descriptions meant merely to describe some example hardware implementations.

A regenerator can be viewed as a transponder with two line ports, instead of one client port. Specifically, the regenerator 10A is formed from a single device 12 that has two line ports 16E, 16W. It is also possible to implement the regenerator 10B, 10C via two back-to-back optical modules 14, each having its line port 16E, 16W, and each interconnecting client ports 18 to one another. The following FIGS. include example hardware LO OTN regenerator 10 configurations along with a logical flow diagram illustrating OTN functions implemented therein. Those skilled in the art will recognize the various OTN functions that are realized in electrical circuitry, such as Field-Programmable Gate Arrays (FPGAs), Application-Specific Integrated Circuits (ASICs), customized OTN processing circuitry, etc. The term modem used in the logical flow diagram is an optical device configured to take an OTN signal and transmit it optically. All of the LO OTN regenerators 10 include two line ports 16E, 16W with the E and W used to denote East and West—these are logical terms to understand the flow and not meant to be actual directions, i.e., West is to the left of the page and East is to the right of the page. In an embodiment, the single device 12 has all of the signal flow contained within a single module, namely the interconnect at the LO signal rate between the two ports 16E, 16W. In another embodiment, the single device 12 can also include two optical transceivers (different modules) with the LO signals interconnected via a backplane or switched via a switch module. The back-to-back optical modules 14 can include the interconnecting client ports 18 via actual cables in the case where the modules 14 are muxponders. Thus, the difference between the regenerator 10A and the regenerators 10B, 10C is the regenerator 10A has an electrical interconnect (that is internal to the single device), and the regenerators 10B, 10C have optical connections for the interconnecting client ports 18, and these optical connections are external to the devices thus requiring management.

FIG. 1A is a LO OTN regenerator 10A where the line ports 16E, 16W are contained within the same device (again, which may be a single module, may be two or more circuit packs with traffic carried across a backplane, or may be a switched node with all traffic going through a switch module). Of note, in the conventional LO OTN regenerator 10A, the HO path layer is terminated, and the service layer paths are all cross connected from one port to the other. A functional model 20 is illustrated for the OTN functions. Those skilled in the art recognize each of the ports 16E, 16W include a transmit (Tx) and receive (Rx) port for bidirectional communications. That is, the line ports 16E, 16W each have two physical interfaces—Tx and Rx. For description purposes, the FIGS. are described in one direction, namely a Rx direction at the line port 16W to a transmit direction at the line port 16E. The other direction implements the same functionality in the opposite direction.

In the example of FIG. 1A, the line rate of the line ports 16E, 16W is an OTUCn, and the LO service layer path rates are ODUk, as an example. The line port 16W, from left to right, terminates at a modem 22, namely an OTUCn received on the line port 16W is terminated optically at the modem 22 and provided to an OTUCn line function 24 which provides the OTUCn to an ODUCn path function 26, which is configured to adapt the OTUCn to an ODUCn. The ODUCn path function 26 provides the ODUCn to an ODUk path function 28, which is configured to adapt the ODUCn to multiple ODUk's. The ODUk's are cross connected 30 to another ODUk path function 28, etc. to the line port 16E.

FIG. 1B is a LO OTN regenerator 10B where each line port 16E, 16W is in a different module 14, e.g., Multiplexed Optical Transponder (MOTR) equipment, which is a muxponder. There are client ports 18 between the modules 14 that are physically cabled via fibers, electrical cables, etc. Also, the back to back MOTR equipment can have more flexible equipping rules, overcoming physical space limitations such as requiring the modules 14 to be in adjacent slots. This MOTR equipment may not have the ability to transmit at the line rate on its client ports, so the client ports are transmitting at the service path rate. In this example, the line rate of the ports 16E, 16W can be OTUCn, and the client rates of the ports 18 can be OTUk. In the functional model 20, each of the modules 14 include the modem 22, the functions 22, 24, 28, and the cross connect 30. After the cross connect 30, the modules 14 include the ODUk path function 28, an OTUk line function 32, and a client modem 34. The client modems 34 have ports 36 that are interconnected to one another to for the ports 18. Note, the modems 22, 34 can include optical pluggable modules, integrated optical devices, etc.

FIG. 1C is a LO OTN regenerator 10C similar to the LO OTN regenerator 10B, but here, the MOTR equipment can only send client traffic at the native service rate, rather than just the service path rate. The functional model 20 for this is shown, using OTUCn as the line rate, ODUk at the service path rate, and ETHn as the native service rate being carried. Here, the OTUk line function 32 from FIG. 1B is replaced with a native client function 38, e.g., Ethernet (ETHn).

HO OTN Regenerator

Figure 1D:
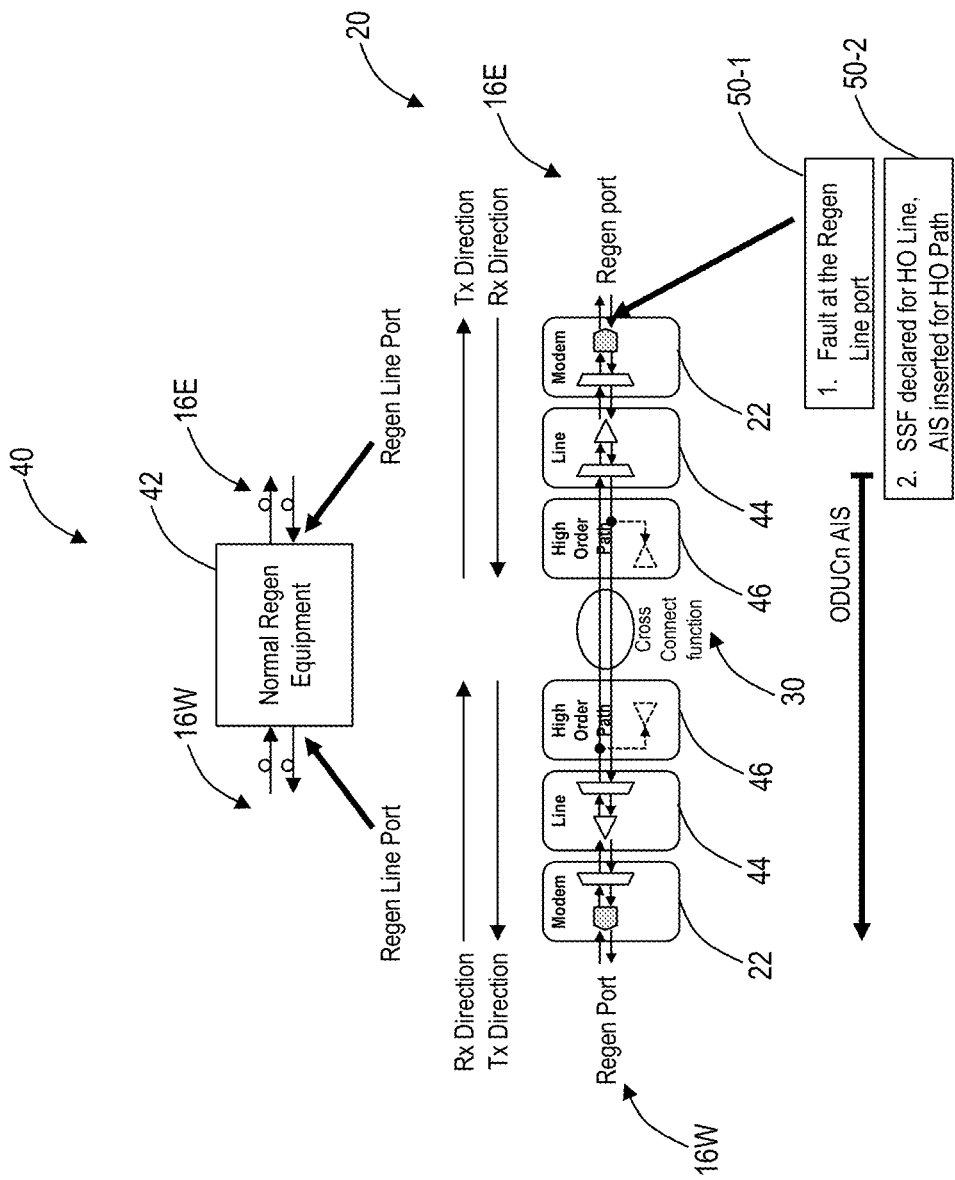
FIG. 1D is a block diagram of a HO OTN regenerator implemented via a device.

FIG. 1D is a block diagram of a HO OTN regenerator 40 implemented via a device 42. Note, the HO OTN regenerator 40 can be referred to as a "normal" regenerator. The HO OTN regenerator 40 is capable of cross connecting traffic at the high order path layer between the line ports 16E, 16W. The functional model 20 includes the modem 22, a line function 44, a HO path function 46, and a cross connect 30. Note that the pass-through traffic is cross connected 30 at the HO path layer. Back to back MOTR equipment could be used for a HO OTN regenerator 40 function as well, provided that the client ports are capable of carrying the signal at that line rate, and the equipment is capable of cross-connecting traffic at the HO path rate between the line and client on each MOTR equipment.

With a normal regenerator, forward traffic conditioning is performed at the HO path when an optical layer/line/HO path fault is detected on one of the line ports 16E, 16W. As described herein, forward traffic conditioning is how a fault (at any of the optical layer, line, or HO path) is forwarded through the cross connect 30. For example, forward traffic conditioning can include transmitting an Alarm Indication Signal (AIS). In the example of FIG. 1D, a fault is detected at the line port 16E (step 50-1), and Server Signal Fail (SSF) is declared for the HO line, and AIS is inserted for the HO path (step 50-2). This provides an ODUCn AIS signal across the cross connect 30.

The HO regenerator 40 (normal regenerator) may not be possible for a variety of reasons. The equipment may not fit in the physical space that is available (e.g., a solution may require equipment spanning four adjacent slots, but four adjacent slots are not available). The vendor may not provide equipment that can function as a normal regenerator for that line rate. The technology may not be capable of cross-connecting at the HO path rate between line ports; thus, the HO path is terminated. They may be cost-prohibitive. If back to back MOTR equipment is used, the client ports or pluggable modules may not be capable of carrying traffic at the line rate required by that normal regenerator (i.e., client pluggable modules may not be OTUC1 capable for an ODUCn regenerator. Thus, they can only carry OTU4 traffic) or only traffic at the native client rate (e.g., Ethernet).

LO OTN Regenerator with HO Traffic Conditioning

The present disclosure includes two general functions to support a LO OTN regenerator 10 with HO traffic conditioning, namely 1) OTN network equipment is determined to be part of a regenerator function, and 2) line faults on one of the regenerator ports 16E, 16W force forward traffic conditioning (e.g., AIS) at the HO path rate on the other regenerator port 16E, 16W even though that path is not continuous, i.e., the HO path is terminated in the LO OTN regenerator 10.

Figure 2:
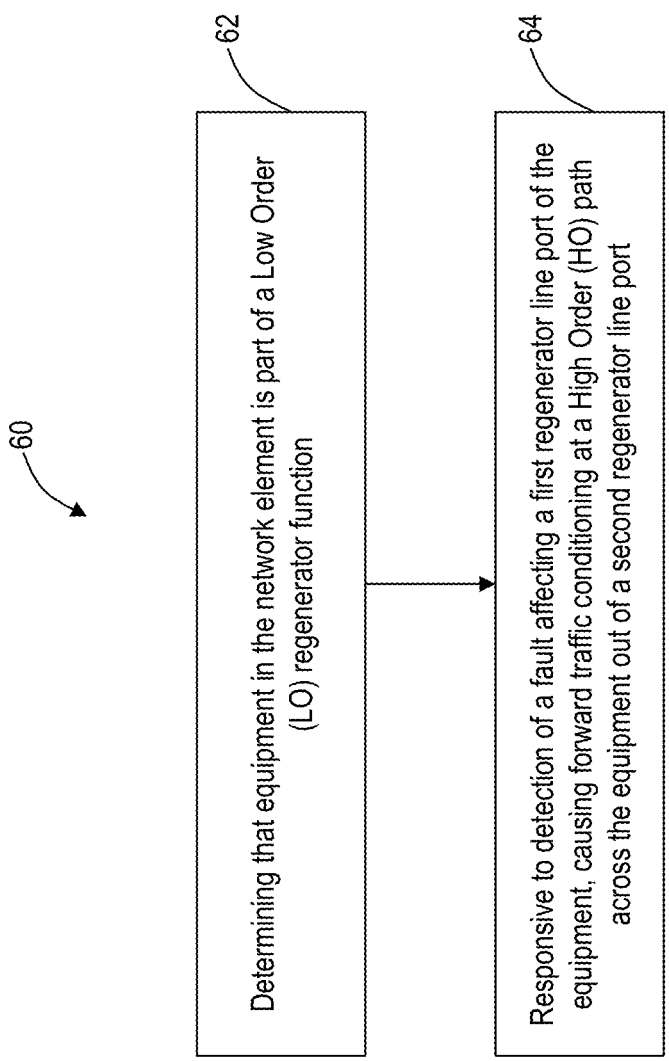
FIG. 2 is a flowchart of a process for implementing a LO OTN regenerator with HO traffic conditioning.

FIG. 2 is a flowchart of a process 60 for implementing a LO OTN regenerator with HO traffic conditioning. The process 60 includes determining that equipment in the network element is part of a Low Order (LO) regenerator function (step 62); and, responsive to detection of a fault affecting a first regenerator line port of the equipment, causing forward traffic conditioning at a High Order (HO) path across the equipment out of a second regenerator line port (step 64).

LO OTN Regenerator Determination

For the determining step 62, one option includes explicit provisioning by a user, i.e., the equipment is provisioned, such as via a management system or the like, to be part of a LO OTN regenerator 10 function. Another option includes automatic detection, i.e., derivation, that the equipment is part of a LO OTN regenerator 10 function. For the LO OTN regenerator 10A in FIG. 1A, it is possible to derive this based on the regenerator line ports 16E, 16W having the same rate, and all traffic being cross connected between the line ports. For the LO OTN regenerator 10B, 10C in FIGS. 1B-1C, it is possible to derive this based on all of the following being true, namely, all regenerator line ports 16E, 16W have the same rate, all client ports 18 are cross connected to the line on each module 14, and the fiber topology is known and demonstrates that all client ports on one module 14 are fibered to client ports of the other module 14.

Forward Traffic Conditioning on the HO Path

The forward traffic conditioning step 64 includes detecting, on one of the regenerator line ports 16E, 16W, a fault, including a fault at any of an optical layer, a line layer, and an HO path layer, resulting in a resultant AIS (and subsequent) traffic conditioning for each LO path within the regenerator port, and forcing insertion of HO path conditioning (AIS), as described herein. This could also include detecting an equipment failure within the regenerator, a regenerator incomplete configuration, interconnected client failures, and the like. This resultant AIS on each LO path is simply a consequence of the previously mentioned faults. It may be used as a means of triggering the HO path conditioning, but so could the failure of the HO path itself be used as the trigger, or the fault that is detected within the regenerator (e.g., equipment failure, incomplete configuration, etc.

Figure 3A:
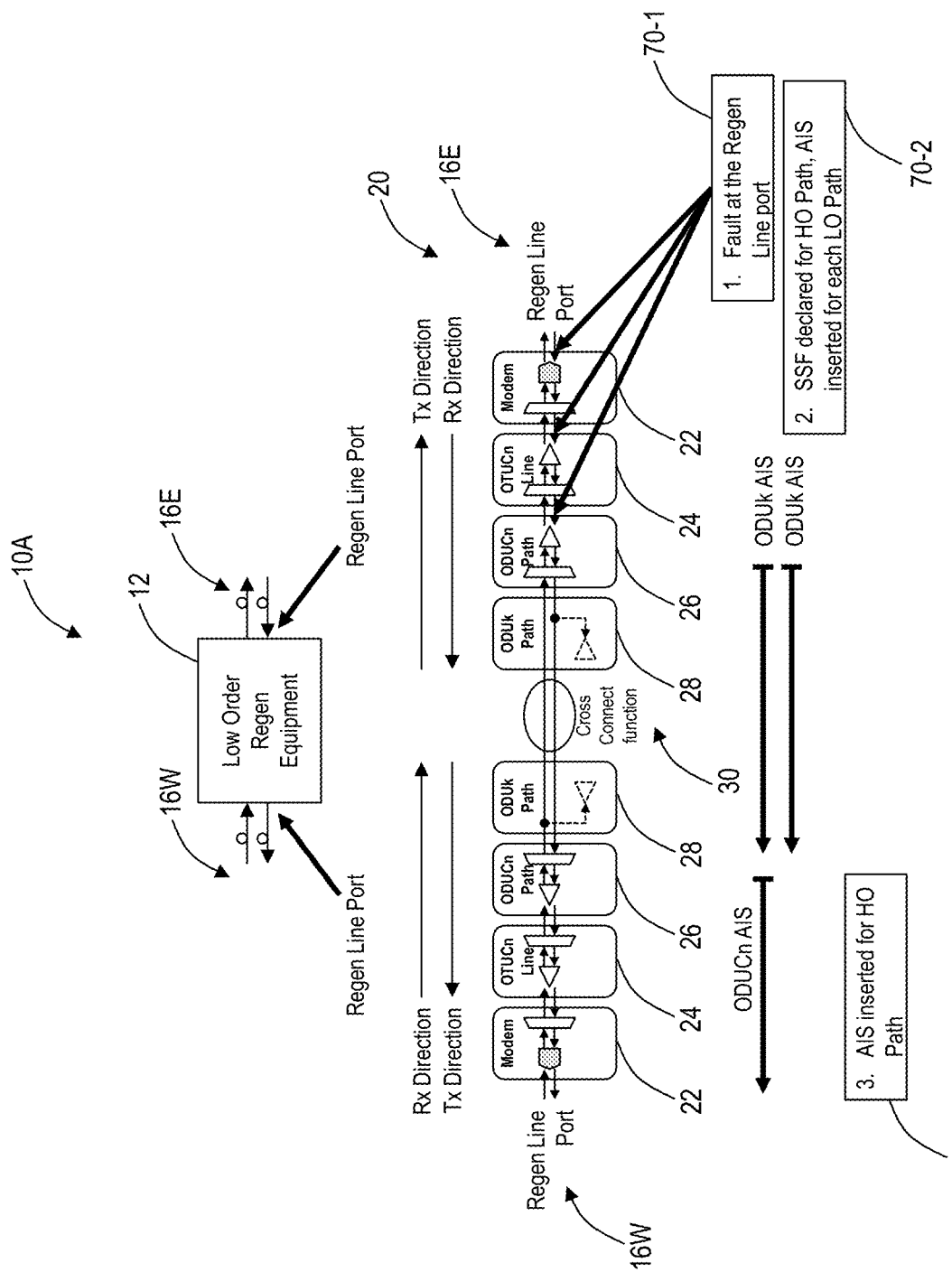
FIGS. 3A-3C are block diagrams of forcing of the forward traffic conditioning on the HO path, for each of the LO OTN regenerator types from FIGS. 1A-1C.
Figure 3B:
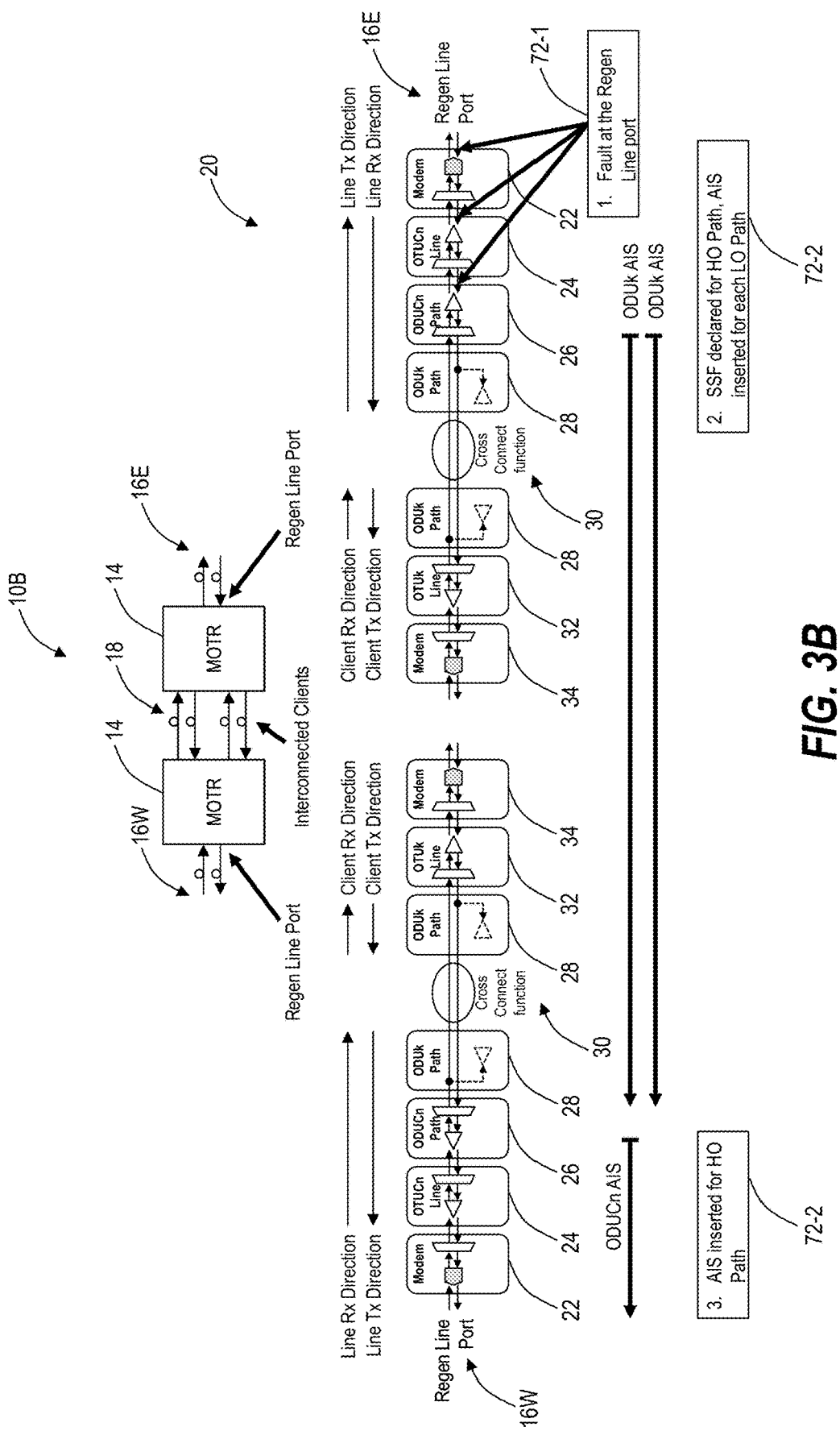
Figure 3C:
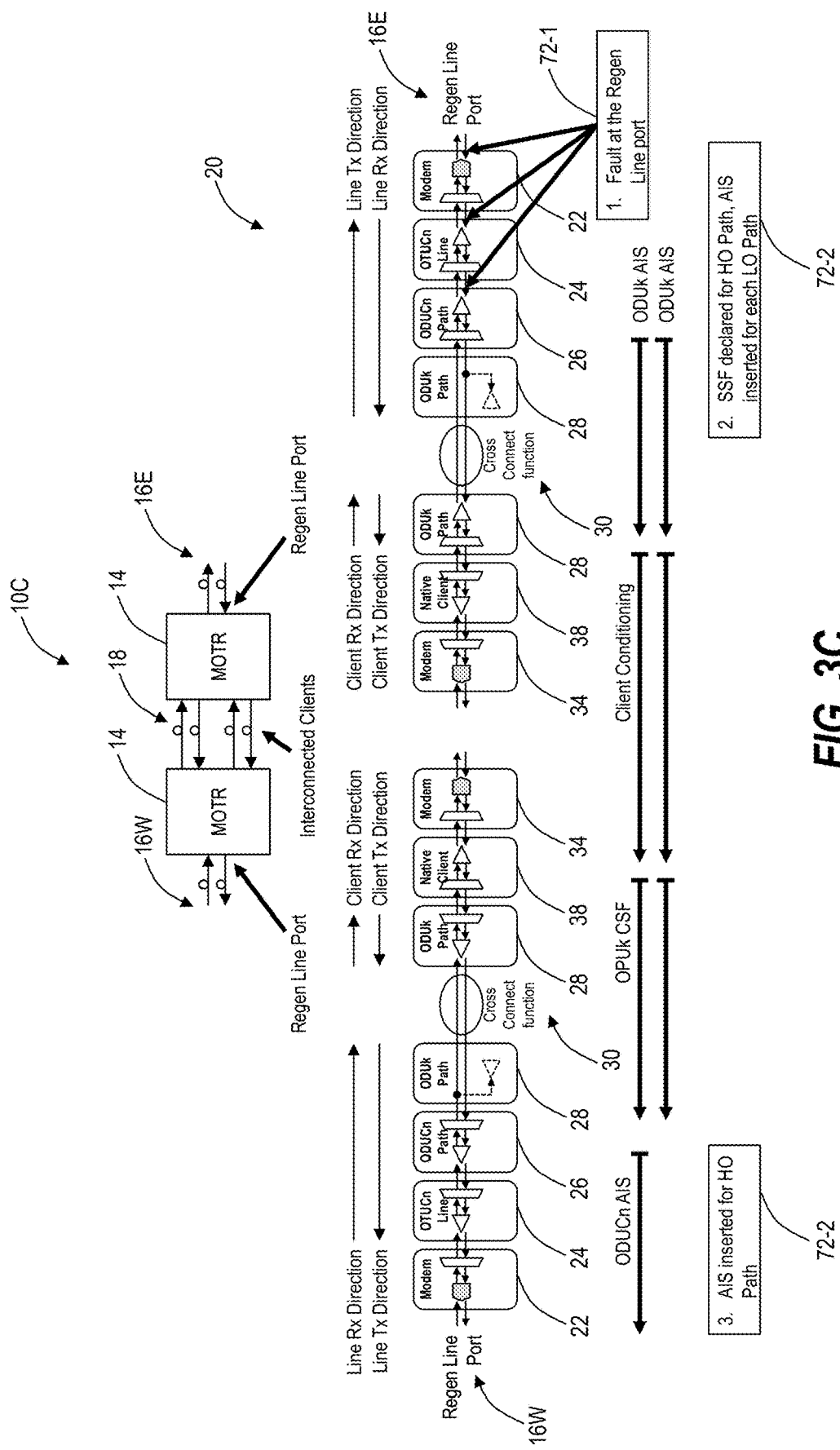

FIGS. 3A-3C are block diagrams of forcing of the forward traffic conditioning on the HO path, for each of the LO OTN regenerator 10A, 10B, 10C types. In FIG. 3A, a fault is detected at the regenerator line port 16E (step 70-1). SSF is declared for the HO path, and AIS is inserted for each LO path (step 70-2). Here, various ODUk AIS signals are provided from the ODUk path function 28 to the other ODUk path function 28 via the cross connect 30. Consequently, AIS is inserted for the HO path to the regenerator line port 16W (step 70-3). Thus, the AIS on the HO signal completely overwrites the AIS on the LO signal.

In FIG. 3B, a fault is detected at the regenerator line port 16E (step 72-1). SSF is declared for the HO path, and AIS is inserted for each LO path (step 72-2). Here, various ODUk AIS signals are provided from the ODUk path function 28 to the other ODUk path function 28 via the cross connect 30, in each module 14, as well as between the modules 14 via the ports 18. Consequently, AIS is inserted for the HO path to the regenerator line port 16W (step 72-3). Thus, the AIS on the HO signal completely overwrites the AIS on the LO signal. In FIG. 3C, the steps 72 are the same as in FIG. 3B, each the ODUk AIS signals are terminated at the native client function 38, which provided client conditioning across the ports 36. At the native client 38 to the ODUk path function 28, an Optical Path Unit k (OPUk) Client Signal Fail (CSF) is generated from the client conditioning, and the ODUCn path function 26 generates an ODUCn AIS.

Figure 4A:
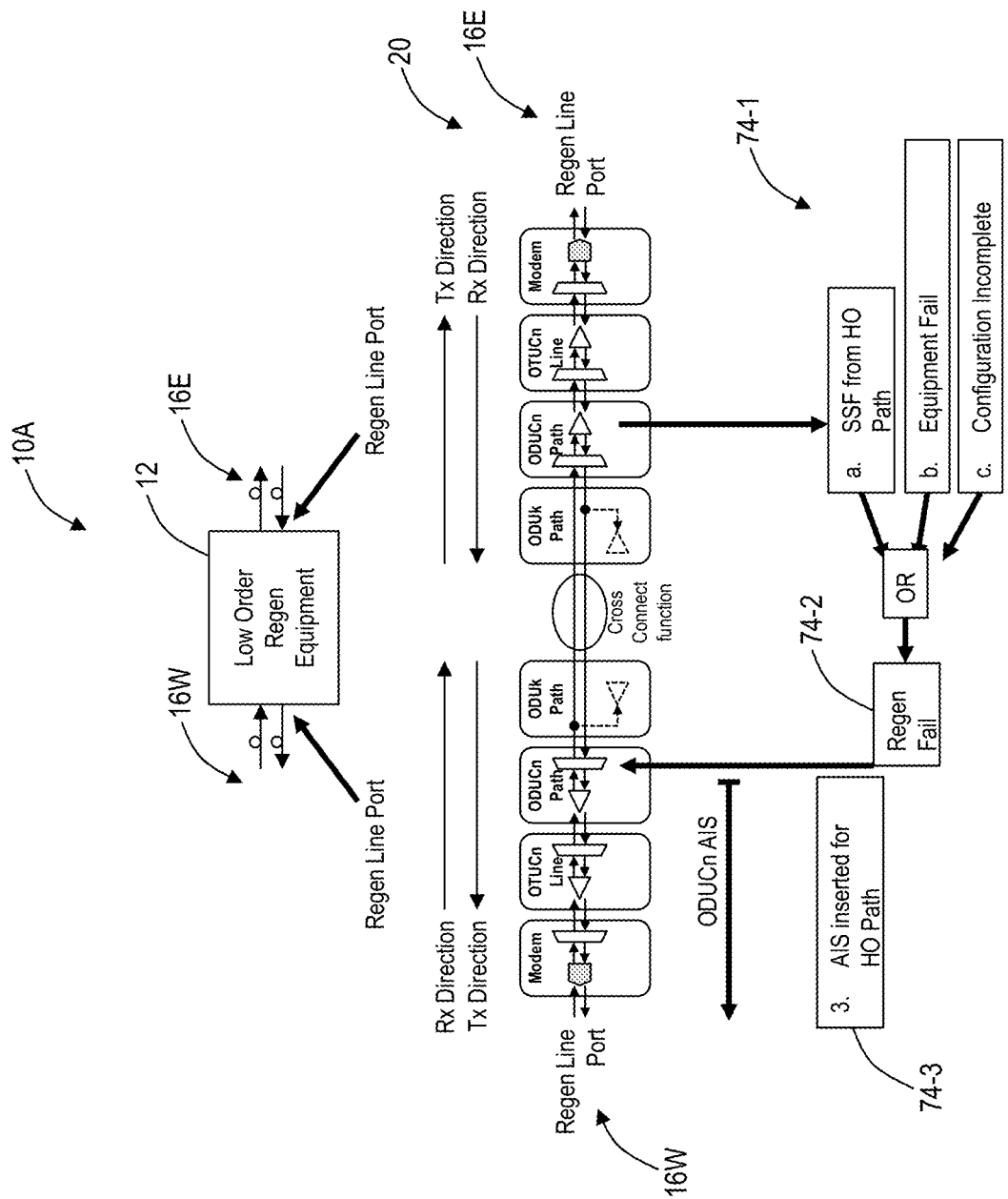
FIGS. 4A-4C are block diagrams of inputs for causing the forward traffic forwarding on the HO path, for each of the LO OTN regenerator types from FIGS. 1A-1C.
Figure 4B:
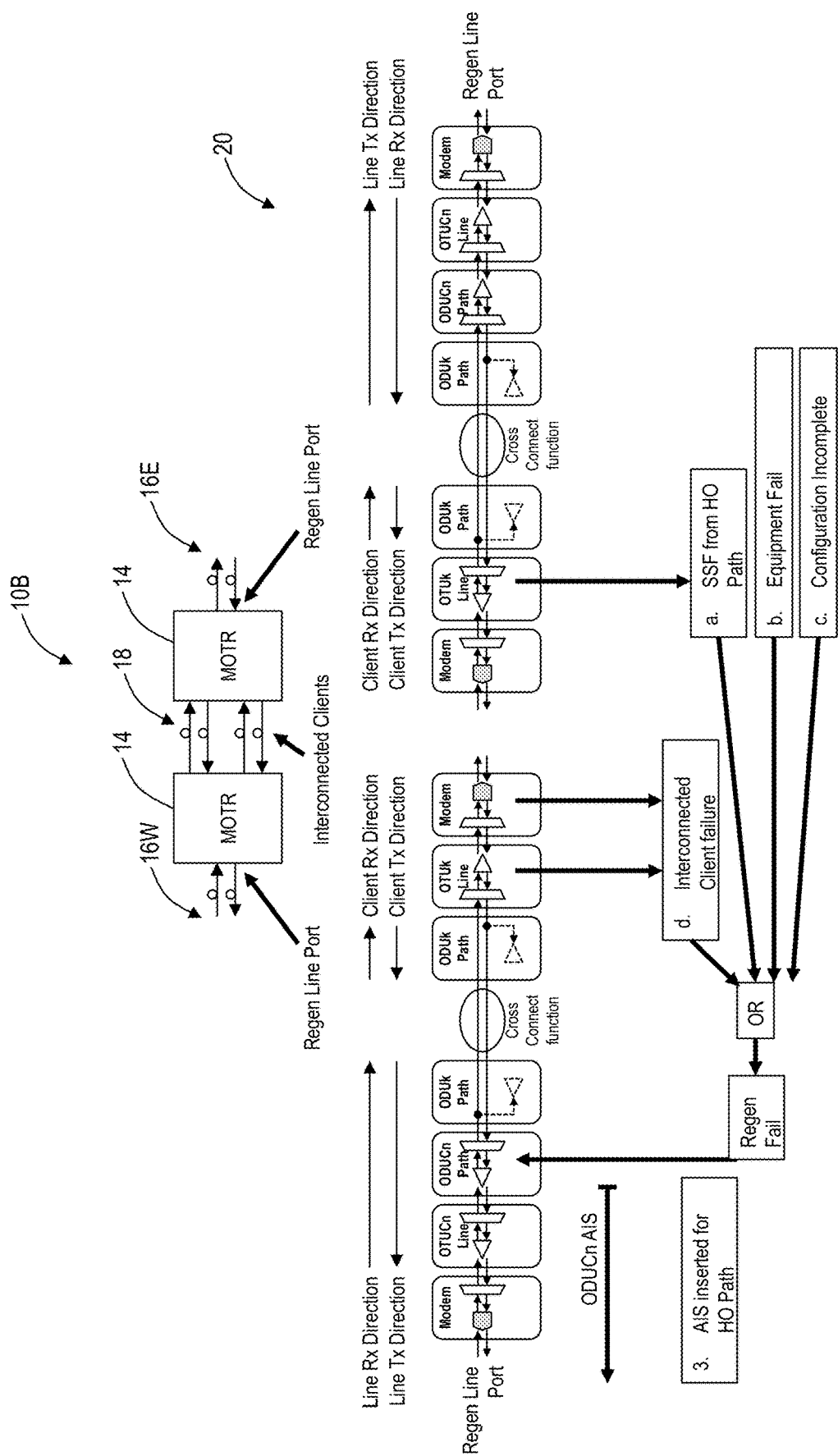
Figure 4C:
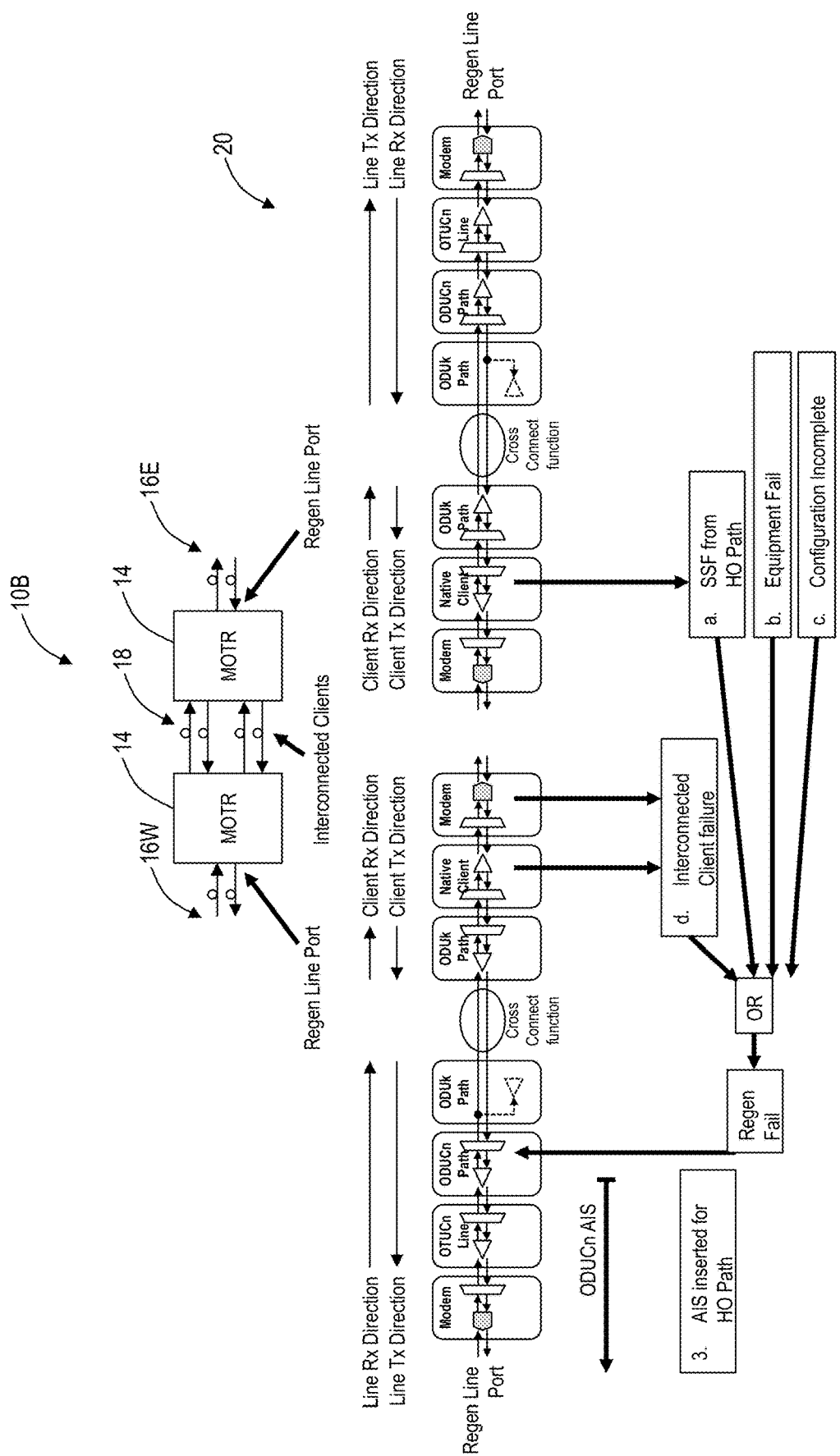

FIGS. 4A-4C are block diagrams of inputs for causing the forward traffic conditioning on the HO path, for each of the LO OTN regenerator 10A, 10B, 10C types. Generally, the present disclosure includes an input between the regenerator line ports 16E, 16W for the HO path. That is, the decision to force the HO path forward traffic conditioning can be triggered by a maintenance interface input (e.g., a Regen Fail) into the HO path function for the regenerator line ports 16E, 16W. Upon assertion of this new input, the HO path function would force forward traffic conditioning. This Regen Fail input can be triggered by any of the following if the system knows that this equipment is performing a regenerator function.

FIG. 4A illustrates a regenerator failure of the LO OTN regenerator 10A, i.e., within a single device. FIG. 4A illustrates a combination of inputs that yield a regenerator failure for the LO regenerator 10A that is built as a single device. The inputs include any of a) a Server Signal Fail (SSF) output from the HO Path function on the other regenerator line port, b) an equipment fail which can include missing or failed equipment within the regenerator 10A, or c) a configuration incomplete which is asserted when all functions and connections are configured or configured correctly (step 74-1). Any of these inputs a)-c) yield a regenerator fail (step 74-2), and consequently, AIS is inserted on the HO path (step 74-3).

FIG. 4B illustrates a regenerator failure of the LO OTN regenerator 10B, i.e., with interconnected OTU clients namely the modules 14. FIG. 4B illustrates a combination of inputs that yield a regenerator failure for the LO regenerator 10B that is built using interconnect clients between modules 14. The inputs include a) Server Signal Fail (SSF) output from the HO Path function on the other regenerator line port, b) equipment fail which can include missing or failed equipment within the regenerator, c) configuration incomplete which is asserted when not all functions and connections are configured or configured correctly, and d) interconnected client failure which can include the following on any (not necessarily all) client port: failures detected at the client modem, and failures detected at the client OTU section layer function which are not forward defect indications or path failures (i.e., not AIS or ODU faults).

FIG. 4C illustrates a regenerator failure of the LO regenerator 10C, i.e., with interconnected native clients. FIG. 4C illustrates a combination of inputs that yield a regenerator failure for the LO regenerator 10C that is built using interconnected native clients between the modules 14. The inputs include a) Server Signal Fail (SSF) output from the HO Path function on the other regenerator line port, b) equipment fail which can include missing or failed equipment within the regenerator, c) configuration incomplete which is asserted when not all functions and connections are configured or configured correctly, and d) interconnected client failure which can include the following on any (not necessarily all) client port: physical signal failures detected at the client modem, and failures detected at the native client layer function which are not forward defect indications (i.e., not LF for Ethernet clients, not AIS for SONET/SDH clients).

Within the LO regenerators 10B, 10C in FIGS. 4B and 4C, the SSF output from the first HO Path function may not be able to be communicated directly to the other HO Path function on the other regen port due to a lack of a communications path between the equipment. In this case, the client port transmitters on the equipment can be configured to be turned off only when the HO Path function declares SSF. This will trigger a physical signal failure on the subsequent modem function which will trigger the HO Path traffic conditioning within the other regen line port. Because of the detection of failures on the interconnected client ports and internal failures/configuration issues, this disclosure can protect against regenerator line faults and any internal issue which prevents the regen from functioning wholly and completely.

LO OTN Regenerator Advantages

Equipment that can function as a LO OTN regenerator 10 may be easier to source because it can be the same equipment as used at terminal sites, e.g., the MOTR equipment. LO OTN regenerators 10 can be lower cost to implement. LO OTN regenerators 10 are allowed to carry traffic at the service rates between back to back MOTR equipment, allowing for the use of potentially lower-cost devices within the MOTRs and lower cost pluggable optics for the client traffic.

Regenerators are still required for some spans, and this disclosure allows regenerators on those spans with traffic conditioning equivalent to normal regenerators (HO) without the additional cost and complexity.

Optical Protection with LO OTN Regenerators

Figure 5A:
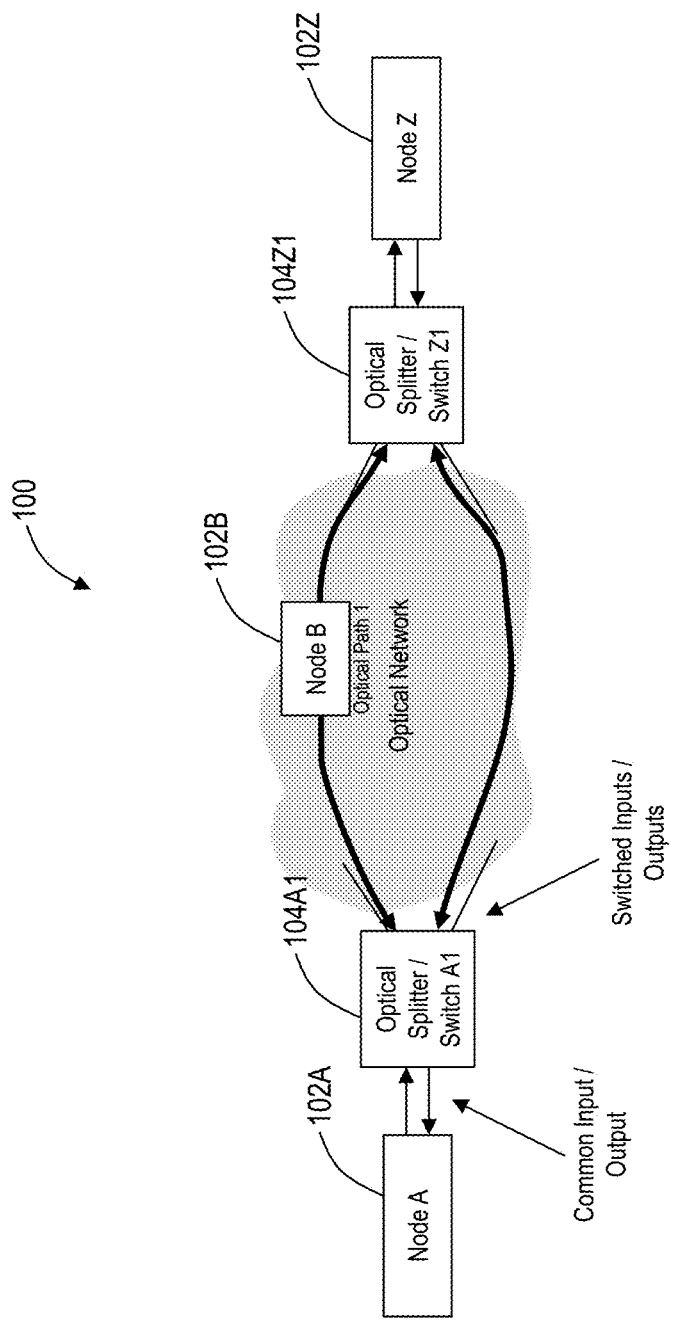
FIG. 5A is a network diagram of a network illustrating Optical Channel protection at the line layer.
Figure 5B:
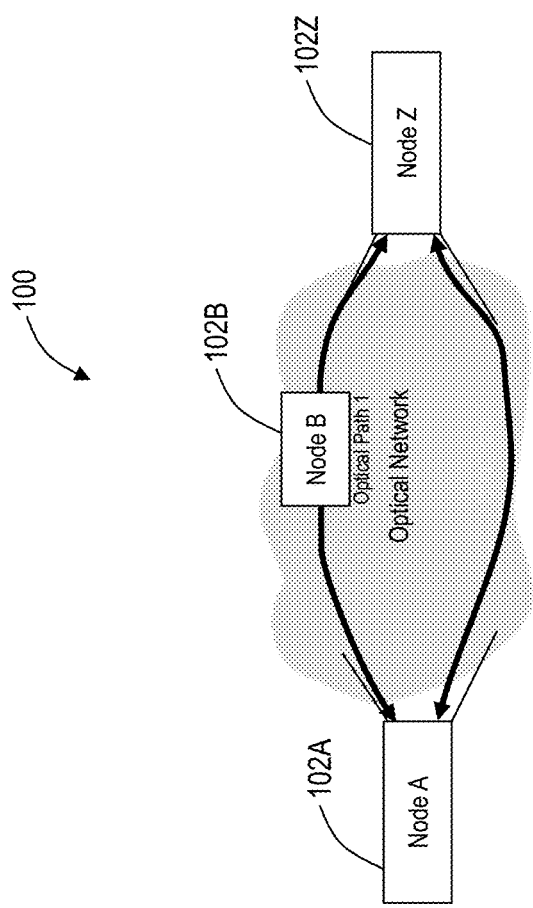
FIG. 5B is a network diagram of the network illustrating Layer 1 Line/Path protection.

This disclosure allows LO OTN regenerators 10 to condition traffic at the HO path rate when a fault occurs on a regenerator line port 16E, 16W. This will trigger a line layer protection switch on configurations, as shown in FIGS. 5A and 5B. This disclosure allows LO OTN regenerators 10 to condition traffic at the HO path rate when a fault occurs on a regenerator line port 16E, 16W. This makes it possible to determine at downstream nodes whether the fault occurred on individual paths or the entire line upstream.

Again, existing LO OTN regenerators normally only condition traffic at the service rate, not the HO path rate. Faults on one regenerator line port 16E, 16W will not trigger a downstream line layer protection switch (either Optical Channel protection at the line layer, or Layer 1 Line/Path protection). As described herein, the present disclosure addresses this such that the LO OTN regenerator 10 conditions traffic at the HO path as well.

FIG. 5A is a network diagram of a network 100 illustrating Optical Channel protection at the line layer. Network elements 102A, 102Z are switched or transponder nodes with a line that is protected at the optical layer. The network 100 includes optical protection switch devices 104A1, 104Z1. Network element 102B is a LO OTN regenerator 10 node. There may be more regenerator nodes along the same optical path, or along the other optical path. In this case, without the HO path forward traffic conditioning at the network element 102B, a regenerator port fault would not be forwarded as a HO path fault, and the corresponding optical protection switch devices 104A1, 104Z1 would not switch. Of note, optical switch devices can switch based on either physical triggers (e.g., loss of light) or failures at the line/HO path rate. Because a normal LO regenerator does not condition traffic at the HO path rate, that is why the device will not switch.

FIG. 5B is a network diagram of the network 100 illustrating Layer 1 Line/Path protection. The network elements 102A, 102Z are switched or transponder nodes with protection configured as either line or HO path layer protection, in a point-to-point configuration. The network element 102B is a LO OTN regenerator 10 node. There may be more regenerator nodes along the same optical path, or along the other optical path.

Again, existing LO OTN regenerators only condition traffic at the service rate, not the HO path rate. Downstream nodes will not have any visibility of whether a failure is due to line or individual path failures upstream, making troubleshooting potentially more challenging and preventing switching. With the HO path visibility, the network element 102B can be a LO OTN regenerator 10 and support either the optical channel protection at the line layer, or Layer 1 Line/Path protection.

Example Network Element

Figure 6:
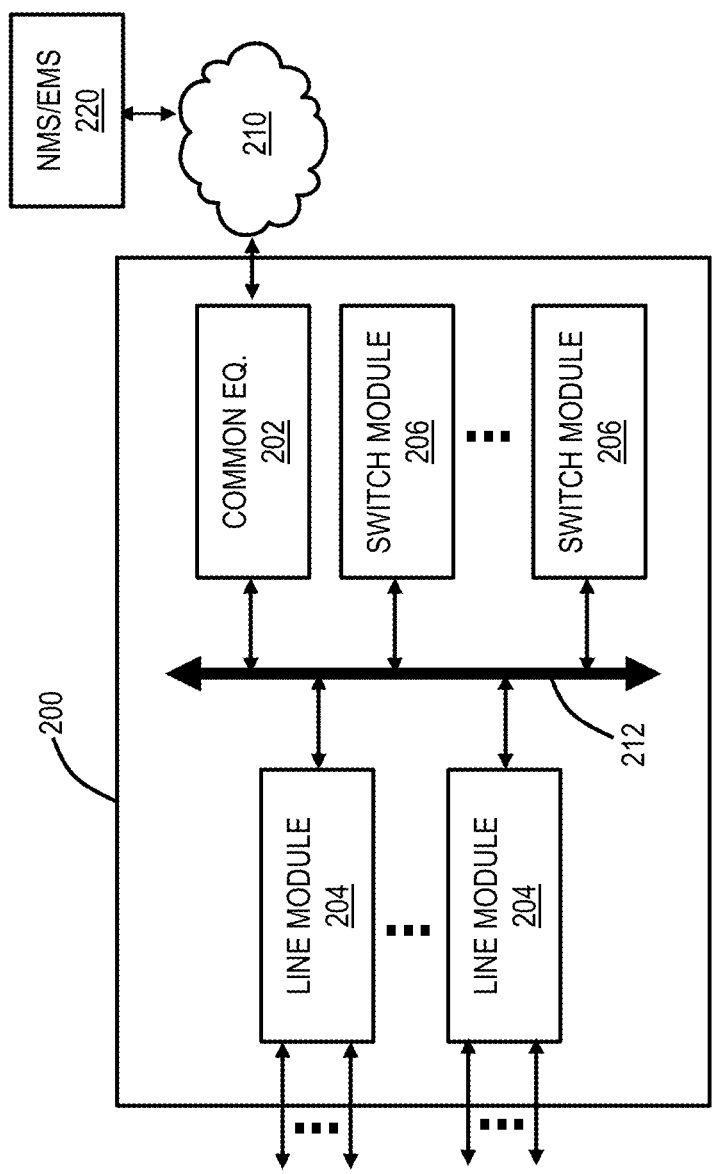
FIG. 6 is a block diagram of an example network element for use with the systems and methods described herein.

FIG. 6 is a block diagram of an example network element 200 for use with the systems and methods described herein. In an embodiment, the network element 200 can be a device that may consolidate the functionality of a Multi-Service Provisioning Platform (MSPP), Digital Cross-Connect (DCS), Ethernet and/or OTN switch, Wave Division Multiplexed (WDM)/Dense WDM (DWDM) platform, Packet Optical Transport System (POTS), etc. into a single, high-capacity intelligent switching system providing Layer 0, 1, 2, and/or 3 consolidation. In another embodiment, the network element 200 can be any of an OTN Add/Drop Multiplexer (ADM), a Multi-Service Provisioning Platform (MSPP), a Digital Cross-Connect (DCS), an optical cross-connect, a POTS, an optical switch, a router, a switch, a WDM/DWDM terminal, an access/aggregation device, etc. That is, the network element 200 can be any digital and/or optical system with ingress and egress digital and/or optical signals and switching of channels, timeslots, tributary units, wavelengths, etc.

In an embodiment, the network element 200 includes common equipment 202, one or more line modules 204, and one or more switch modules 206. The common equipment 202 can include power; a control module; Operations, Administration, Maintenance, and Provisioning (OAM&P) access; user interface ports; and the like. The common equipment 202 can connect to the management system 220 through a data communication network 210. Additionally, the common equipment 202 can include a controller, a shelf processor, a control plane processor, etc. The network element 200 can include an interface 212 for communicatively coupling the common equipment 202, the line modules 204, and the switch modules 206 to one another. For example, the interface 212 can be a backplane, midplane, a bus, optical and/or electrical connectors, or the like. The line modules 204 are configured to provide ingress and egress to the switch modules 206 and to external connections on the links to/from the network element 200. In an embodiment, the line modules 204 can form ingress and egress switches with the switch modules 206 as center stage switches for a three-stage switch, e.g., a three-stage Clos switch. Other configurations and/or architectures are also contemplated.

The line modules 204 can include the device 12, the modules 14, the MOTR equipment, etc. The line modules 204 can include a plurality of optical connections per module, and each module may include a flexible rate support for any type of connection. The line modules 204 can include WDM interfaces, short-reach interfaces, and the like, and can connect to other line modules 204 on remote network elements, end clients, edge routers, and the like. From a logical perspective, the line modules 204 provide ingress and egress ports to the network element 200, and each line module 204 can include one or more physical ports. The switch modules 206 are configured to switch channels, timeslots, tributary units, packets, etc. between the line modules 204. For example, the switch modules 206 can provide wavelength granularity (Layer 0 switching); OTN granularity; Ethernet granularity; and the like. Specifically, the switch modules 206 can include Time Division Multiplexed (TDM) (i.e., circuit switching) and/or packet switching engines.

Those of ordinary skill in the art will recognize the network element 200 can include other components which are omitted for illustration purposes, and that the systems and methods described herein are contemplated for use with a plurality of different network elements with the network element 200 presented as an example type of network element. For example, in another embodiment, the network element 200 may not include the switch modules 206, but rather have the corresponding functionality in the line modules 204 (or some equivalent) in a distributed fashion. Also, the network element 200 may omit the switch modules 206 and that functionality, such as in a WDM network element. For the network element 200, other architectures providing ingress, egress, and switching are also contemplated for the systems and methods described herein. In general, the systems and methods described herein contemplate use with any network element, and the network element 200 is merely presented as an example for the systems and methods described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, processor, circuit, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A network element configured to operate in an Optical Transport Network (OTN) network comprising:

one or more modules including a first regenerator port and a second regenerator port, wherein the one or more modules are configured to provide a Low Order (LO) regenerator function; and circuitry configured to
detect that the one or more modules are part of the LO regenerator function, and
responsive to detection of a fault affecting the first regenerator port, cause forward traffic conditioning at a High Order (HO) path out of the second regenerator port, wherein HO signal information is passed between the first regenerator port and the second regenerator port.

2. The network element of claim 1, wherein the forward traffic conditioning includes an Alarm Indication Signal (AIS) on the HO path.

3. The network element of claim 1, wherein the forward traffic conditioning is triggered through a Server Signal Fail (SSF) output from a HO path function associated with the first regenerator port.

4. The network element of claim 1, wherein the forward traffic conditioning is triggered by any of equipment failures and missing equipment associated with the LO regenerator function.

5. The network element of claim 1, wherein the forward traffic conditioning is triggered by any of incomplete configuration and incorrect configuration of the LO regenerator function.

6. The network element of claim 1, wherein the forward traffic conditioning is triggered by detection of failed Optical Transport Unit (OTU) client ports detected between the first regenerator port and the second regenerator port.

7. The network element of claim 1, wherein the forward traffic conditioning is triggered by detection of failed native client ports between the first regenerator port and the second regenerator port.

8. The network element of claim 1, wherein the one or more modules are detected as being part of the LO regenerator function based on any of i) an automatic determination utilizing signal rates between the first regenerator port and the second regenerator port and based on cross connects between the first regenerator port and the second regenerator port, and ii) explicit configuration by a user.

9. The network element of claim 1, wherein the one or more modules include a single module including both the first regenerator port and the second regenerator port.

10. The network element of claim 1, wherein the one or more modules include two modules each including one of the first regenerator port and the second regenerator port, and wherein the two modules communicate to one another via an interface associated with the network element.

11. The network element of claim 1, wherein the one or more modules include two modules each including one of the first regenerator port and the second regenerator port, and wherein the two modules communicate to one another via ports that are cabled between one another.

12. A method implemented in a network element configured to operate in an Optical Transport Network (OTN) network, the method comprising:
determining that equipment in the network element is part of a Low Order (LO) regenerator function; and
responsive to detection of a fault affecting a first regenerator port of the equipment, causing forward traffic conditioning at a High Order (HO) path across the equipment out of a second regenerator port, wherein HO signal information is passed between the first regenerator port and the second regenerator port.

13. The method of claim 12, wherein the forward traffic conditioning includes an Alarm Indication Signal (AIS) on the HO path.

14. The method of claim 12, wherein the forward traffic conditioning is triggered by any of a Server Signal Fail (SSF) output from a HO path function associated with the first regenerator port,
any of equipment failures and missing equipment associated with the LO regenerator function,
any of incomplete configuration and incorrect configuration of the LO regenerator function,
detection of failed Optical Transport Unit (OTU) client ports detected between the first regenerator port and the second regenerator port, and
failed native client ports between the first regenerator port and the second regenerator port.

15. The method of claim 12, wherein the one or more modules are detected as being part of the LO regenerator function based on an automatic determination utilizing signal rates between the first regenerator port and the second regenerator port and based on cross connects between the first regenerator port and the second regenerator port.

16. The method of claim 12, wherein the one or more modules include a single module including both the first regenerator port and the second regenerator port.

17. The method of claim 12, wherein the one or more modules include two modules each including one of the first regenerator port and the second regenerator port, and wherein the two modules communicate to one another via an interface associated with the network element.

18. The method of claim 12, wherein the one or more modules include two modules each including one of the first regenerator port and the second regenerator port, and wherein the two modules communicate to one another via ports that are cabled between one another.

19. A system comprising:
one or more modules including a first regenerator port and a second regenerator port, wherein the one or more modules are configured to provide a Low Order (LO) Optical Transport Network (OTN) regenerator function; and
circuitry configured to cause forward traffic conditioning at a High Order (HO) path out of the second regenerator port via passing a Regen Fail signal between the first regenerator port and the second regenerator port, responsive to detection of a fault affecting the first regenerator port, wherein HO signal information is passed between the first regenerator port and the second regenerator port.

20. The system of claim 19, wherein the forward traffic conditioning includes an Alarm Indication Signal (AIS) on the HO path.

* * * * *